(12) United States Patent
Selensky et al.

(10) Patent No.: US 10,832,372 B2
(45) Date of Patent: Nov. 10, 2020

(54) APPARATUS AND METHOD FOR ADAPTING IMAGE PROCESSING BASED ON A SHAPE OF A DISPLAY DEVICE FOR A MOTOR VEHICLE

(71) Applicants: Conti Temic microelectronic GmbH, Nuremberg (DE); Continental Automotive GmbH, Hannover (DE)

(72) Inventors: Denis Selensky, Frankfurt (DE); Markus Friebe, Gefrees (DE)

(73) Assignees: Conti Temic microelectronic GmbH, Neurnberg (DE); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/614,859

(22) PCT Filed: Sep. 4, 2018

(86) PCT No.: PCT/DE2018/200082
§ 371 (c)(1),
(2) Date: Nov. 19, 2019

(87) PCT Pub. No.: WO2019/057253
PCT Pub. Date: Mar. 28, 2019

(65) Prior Publication Data
US 2020/0111191 A1    Apr. 9, 2020

(30) Foreign Application Priority Data

Sep. 22, 2017   (DE) .................. 10 2017 216 822

(51) Int. Cl.
*G06T 3/00*    (2006.01)
*G06T 7/80*    (2017.01)
*B60K 35/00*   (2006.01)

(52) U.S. Cl.
CPC .............. *G06T 3/005* (2013.01); *B60K 35/00* (2013.01); *G06T 7/80* (2017.01);
(Continued)

(58) Field of Classification Search
None
See application file for complete search history.

(56) References Cited

U.S. PATENT DOCUMENTS

| 7,999,760 B2 | 8/2011 | Giegold et al. |
| 2008/0089611 A1 | 4/2008 | McFadyen et al. |

(Continued)

FOREIGN PATENT DOCUMENTS

| DE | 102007021230 | 11/2008 |
| DE | 102013220477 | 4/2015 |

(Continued)

OTHER PUBLICATIONS

English translation of the International Search Report of the International Searching Authority for International Application PCT/DE2018/200082, dated Dec. 10, 2018, 3 pages, European Patent Office, HV Rijswijk, Netherlands.

(Continued)

*Primary Examiner* — Nicholas R Wilson
(74) *Attorney, Agent, or Firm* — W. F. Fasse

(57) ABSTRACT

A method and an apparatus are for adapting image processing based on a shape of a display device for a motor vehicle. The apparatus includes: a capture device configured to capture a shape of a display device, an extrinsic camera parameter of a camera, an intrinsic camera parameter of the camera, and a of view of the camera; an arithmetic unit configured to calculate a reprojection surface and a correspondence table based on the captured shape of the display device, the extrinsic camera parameter, the intrinsic camera parameter, and the field of view; and an image processing (Continued)

device configured to perform adapted image processing that is adapted based on the reprojection surface and the correspondence table.

8 Claims, 3 Drawing Sheets

(52) U.S. Cl.
CPC .. *B60K 2370/1529* (2019.05); *B60K 2370/21* (2019.05); *B60K 2370/52* (2019.05)

(56) References Cited

U.S. PATENT DOCUMENTS

2015/0160539 A1   6/2015   Bassi et al.
2017/0341582 A1   11/2017   Friebe et al.

FOREIGN PATENT DOCUMENTS

| DE | 102015202863 | 8/2016 | |
| EP | 2 667 615 | 11/2013 | |
| EP | 3 082 127 | 10/2016 | |
| WO | WO 2007/000178 | 1/2007 | |
| WO | WO 2015/044280 | 4/2015 | |
| WO | WO-2015044280 A1 * | 4/2015 | ............. G02B 27/01 |

OTHER PUBLICATIONS

PCT International Preliminary Report on Patentability including English Translation of PCT Written Opinion of the International Searching Authority for International Application PCT/DE2018/200082, dated Mar. 24, 2020, 7 pages, International Bureau of WIPO, Geneva, Switzerland.

German Search Report for German Patent Application No. 10 2017 216 822.6, dated Feb. 14, 2018, 7 pages, German Patent and Trademark Office, Muenchen, Germany, with partial English translation, 5 pages.

* cited by examiner

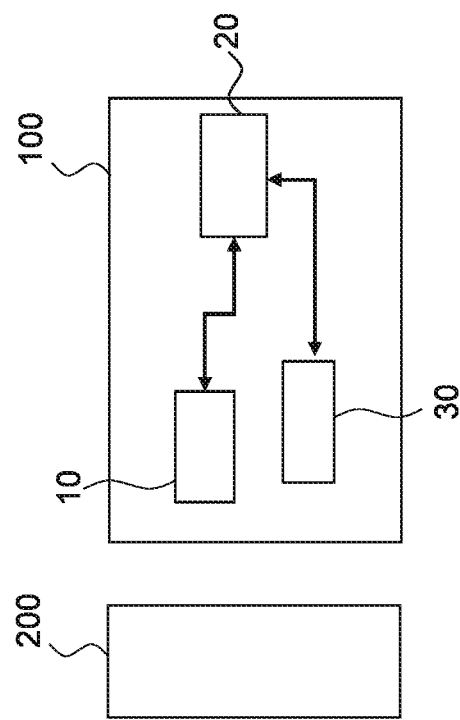
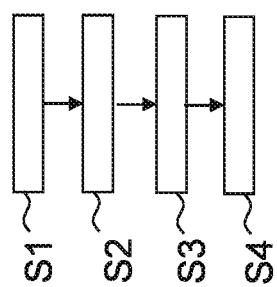

APPARATUS AND METHOD FOR ADAPTING IMAGE PROCESSING BASED ON A SHAPE OF A DISPLAY DEVICE FOR A MOTOR VEHICLE

FIELD OF THE INVENTION

The present invention relates to image processing and display systems in motor vehicles.

In particular, the present invention relates to an apparatus and a method for adapting image processing based on a shape of a display device for a motor vehicle.

BACKGROUND OF THE INVENTION

In current image processing functions performed by motor vehicle all-round view systems or environment display systems, also known as "surround view systems", the shape of the display or of the display device is not incorporated or taken into consideration. However, the shape of the display or display device has a major effect on visualization quality.

Visible reprojection artifacts from other mobile automotive components, such as side doors or tailgates and filler caps, may also appear.

SUMMARY OF THE INVENTION

It is an object of the present invention to provide an improved all-round view or environment display of the motor vehicle for a driver assistance system.

Said object is achieved by the subject matter of the independent claims. Further developments and embodiments may be inferred from the dependent claims, the description and the figures of the drawings.

A first aspect of the present invention relates to an apparatus for adapting image processing based on a shape of a display device for a motor vehicle.

The apparatus for adapting image processing based on a shape of a display device for a motor vehicle comprises a capture device which is configured to capture a shape of a display device and an extrinsic camera parameter of a camera, an intrinsic camera parameter of the camera, and at least one field of view of the camera.

In other words, the capture device is configured to capture the extrinsic camera parameters of the camera and the intrinsic camera parameters of the camera, wherein this may comprise capture of all the extrinsic and intrinsic camera parameters.

The apparatus further comprises an arithmetic unit which is configured to calculate a reprojection surface and a correspondence table based on the captured shape of the display device and based on the extrinsic camera parameter, the intrinsic camera parameter, and the at least one field of view.

The apparatus further comprises an image processing device, which is configured to perform adapted image processing based on the calculated reprojection surface and the calculated correspondence table.

The term "shape" of the display device as used by the present invention here comprises, for example, the features of the surface of the display device, for instance the curvature profile over a display width.

In one advantageous embodiment of the present invention, provision is made for the capture device to be configured to capture the shape of the display device of an A pillar of a motor vehicle.

In one advantageous embodiment of the present invention, provision is made for the arithmetic unit to be configured to calculate the reprojection surface to compensate a curvature of the display device.

This advantageously makes it possible to improve the display quality of surroundings scenarios and to avoid image distortions of displayed image information.

In one advantageous embodiment of the present invention, provision is made for the arithmetic unit to be configured to calculate the reprojection surface based on a projected display grid.

In one advantageous embodiment of the present invention, provision is made for the arithmetic unit to be configured to generate the projected display grid on a subarea of the field of view.

In one advantageous embodiment of the present invention, provision is made for the shape of the display device of an A pillar of a motor vehicle to be captured.

In one advantageous embodiment of the present invention, provision is made for the reprojection surface to be calculated to compensate a curvature of the display device.

In one advantageous embodiment of the present invention, provision is made for the reprojection surface to be calculated based on a projected display grid.

In one advantageous embodiment of the present invention, provision is made for the projected display grid to be generated on a subarea of the field of view.

The configurations and further developments described may be combined with each other as desired.

Further possible configurations, further developments and implementations of the present invention also comprise combinations which are not explicitly mentioned of features of the present invention as described above or hereinafter with regard to the embodiments.

The appended drawings are intended to provide further understanding of the embodiments of the present invention.

The appended drawings illustrate embodiments and serve, in connection with the description, to explain concepts of the present invention.

Other embodiments and many of the stated advantages are revealed by the figures of the drawings. The depicted elements of the figures of the drawings are not necessarily shown true to scale relative to one another.

BRIEF DESCRIPTION OF THE FIGURES

In which:

FIG. 1 shows a schematic depiction of an apparatus for adapting image processing based on a shape of a display device for a motor vehicle according to one exemplary embodiment of the present invention;

FIG. 2 shows a schematic depiction of a flow chart for a method for adapting image processing based on a shape of a display device for a motor vehicle according to a further exemplary embodiment of the present invention.

DETAILED DESCRIPTION OF THE EXEMPLARY EMBODIMENTS

Figure 3:
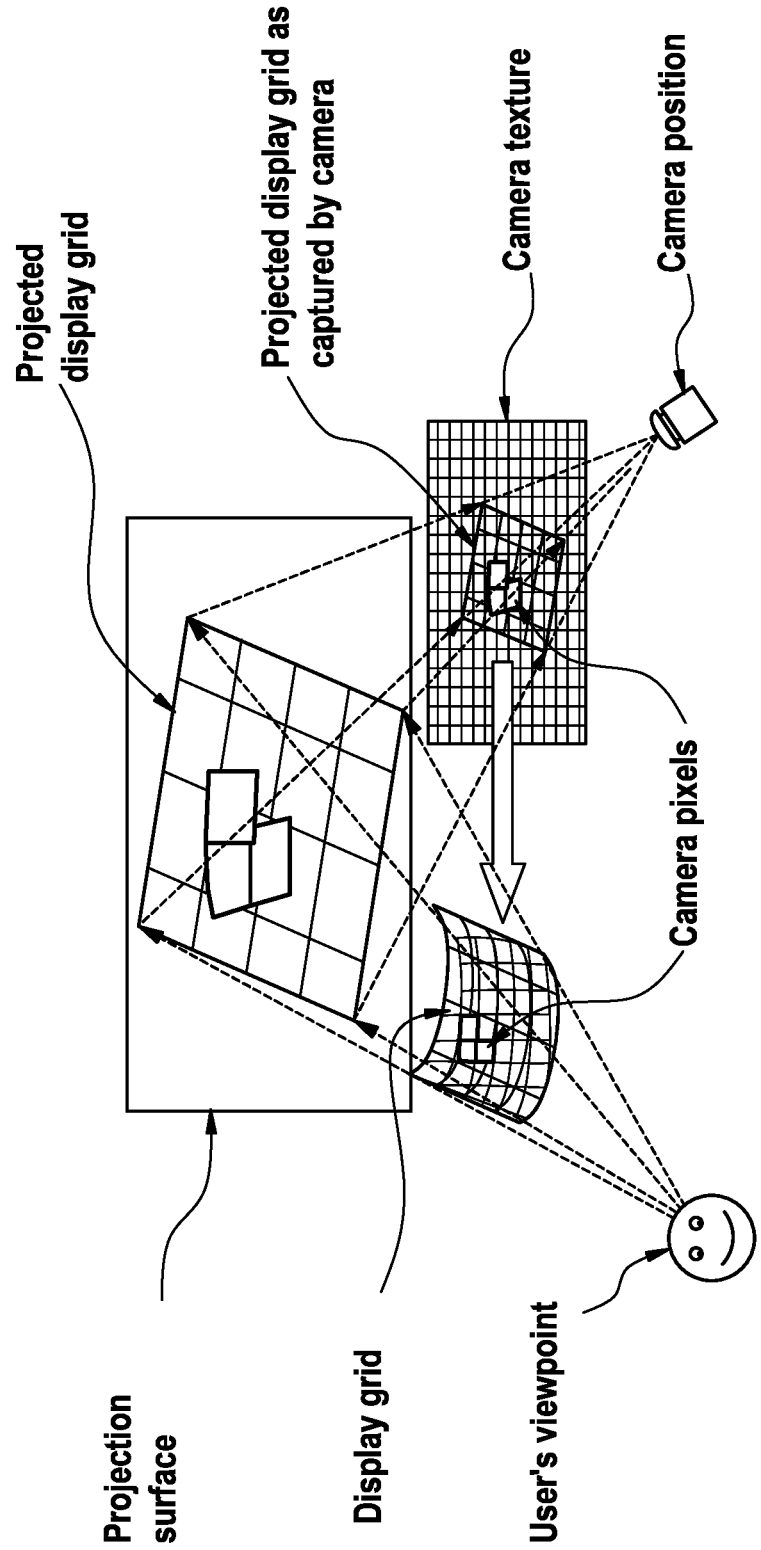
FIG. 3 shows a schematic depiction of a method for adapting image processing based on a shape of a display device for a motor vehicle according to a further exemplary embodiment of the present invention.

In the figures of the drawings, identical reference signs denote identical or functionally identical elements, parts, components or method steps, unless indicated otherwise.

The motor vehicle or vehicle is, for example, a motor vehicle or a hybrid vehicle, for example a hybrid vehicle with coasting function, for example a motorcycle, a bus or a truck or a bicycle.

FIG. 1 shows a schematic depiction of an apparatus for adapting image processing based on a shape of a display device for a motor vehicle according to one exemplary embodiment of the present invention.

The apparatus 100 for adapting image processing based on a shape of a display device 200 for a motor vehicle comprises a capture device 10, an arithmetic unit 20 comprising a computing device, and an image processing device 30.

The apparatus 100 may thus provide an improved camera surround view system with adapted image reprojection.

The capture device 10 is configured to capture a shape of a display device 200 and at least one extrinsic camera parameter of a camera, at least one intrinsic camera parameter of the camera, and at least one field of view of the camera.

The arithmetic unit 20 is configured to calculate a reprojection surface and a correspondence table based on the captured shape of the display device 200 and based on the at least one extrinsic camera parameter, the at least one intrinsic camera parameter, and the at least one field of view.

The image processing device 30 is configured to perform adapted image processing based on the calculated reprojection surface and the calculated correspondence table.

FIG. 2 shows a schematic depiction of a flow chart for a method for adapting image processing based on a shape of a display device for a motor vehicle according to a further exemplary embodiment of the present invention.

The method for adapting image processing based on a shape of a display device 200 for a motor vehicle comprises the following method steps:

A first method step involves capturing S1 the shape of the display device 200 by means of a capture device 10.

A second method step involves capturing S2 an extrinsic camera parameter, an intrinsic camera parameter, at least one field of view of the camera by means of the capture device 10.

A third method step involves calculating S3 a reprojection surface and a correspondence table based on the captured shape of the display device 200 and based on the at least one extrinsic camera parameter, the at least one intrinsic camera parameter, and the at least one field of view of the camera by means of an arithmetic unit 20.

A fourth method step involves performing S4 the adapted image processing based on the calculated reprojection surface and the calculated correspondence table by means of an image processing device 30.

FIG. 3 shows a schematic depiction of a method for adapting image processing based on a shape of a display device 200 for a motor vehicle according to a further exemplary embodiment of the present invention.

Figure 4:
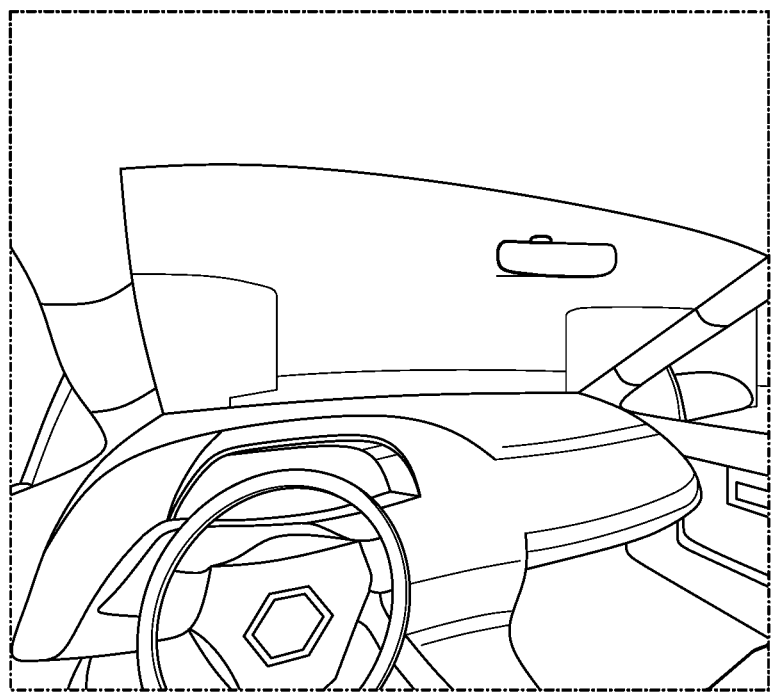
FIG. 4 shows a schematic depiction of a simulation of the camera reprojection with image distortion correction of the display shape according to a further exemplary embodiment of the present invention.

FIG. 4 shows a schematic depiction of a simulation of the camera reprojection with distortion correction of the display shape according to a further exemplary embodiment of the present invention.

Although the present invention has been described above on the basis of preferred exemplary embodiments, it is not limited thereto but is instead be modifiable in various ways. In particular, the invention may be changed or modified in manifold ways, without deviating from the essence of the invention.

In addition, it is pointed out that "comprising" and "having" do not rule out any other elements or steps and "a" or "one" does not rule out a plurality.

It should further be pointed out that features or steps which have been described with reference to one of the above exemplary embodiments may also be used in combination with other features or steps of other above-described exemplary embodiments. Reference signs in the claims are not to be regarded as limiting.

The invention claimed is:

1. An apparatus comprising:
  a capture device configured to capture a shape of a display device of an A-pillar of a motor vehicle, an extrinsic camera parameter of a camera, an intrinsic camera parameter of the camera, and at least one field of view of the camera;
  an arithmetic unit configured to calculate a reprojection surface and a correspondence table based on the shape of the display device, the extrinsic camera parameter, the intrinsic camera parameter, and the at least one field of view; and
  an image processing device configured to perform adapted image processing that is adapted based on the reprojection surface and the correspondence table.

2. The apparatus according to claim 1, wherein the shape of the display device comprises a curvature of the display device, and the arithmetic unit is configured to calculate the reprojection surface to compensate the curvature of the display device.

3. The apparatus according to claim 1, wherein the arithmetic unit is configured to calculate the reprojection surface based on a projected display grid.

4. The apparatus according to claim 3, wherein the arithmetic unit is configured to generate the projected display grid on a subarea of the field of view.

5. A method comprising the steps:
  capturing a shape of a display device of an A-pillar of a motor vehicle by a capture device;
  capturing an extrinsic camera parameter of a camera, an intrinsic camera parameter of the camera, and at least one field of view of the camera by the capture device;
  calculating a reprojection surface and a correspondence table based on the shape of the display device, the extrinsic camera parameter, the intrinsic camera parameter, and the at least one field of view of the camera by an arithmetic unit; and
  performing an adapted image processing that is adapted based on the reprojection surface and the correspondence table by an image processing device.

6. The method according to claim 5, wherein the shape of the display device comprises a curvature of the display device, and the reprojection surface is calculated to compensate the curvature of the display device.

7. The method according to claim 5, wherein the reprojection surface is calculated based on a projected display grid.

8. The method according to claim 7, wherein the projected display grid is generated on a subarea of the field of view.

* * * * *